Patented Oct. 7, 1924.

1,510,785

UNITED STATES PATENT OFFICE.

KEY KAMIYA AND TSURUICHI H. WAKINO, OF LOS ANGELES, CALIFORNIA.

COMPOSITION OF MATTER FOR THE TREATMENT OF PYORRHEA.

No Drawing. Application filed August 1, 1921. Serial No. 489,154.

*To all whom it may concern:*

Be it known that we, KEY KAMIYA and TSURUICHI H. WAKINO, subjects of the Emperor of Japan, residing at Los Angeles, in the county of Los Angeles and State of California, have invented new and useful Improvements in Composition of Matter for the Treatment of Pyorrhea, of which the following is a specification.

The object of our invention is to provide a simple and inexpensive and efficacious composition of matter that may be used for the treatment of pyorrhea and like diseases of the teeth and gums.

Our composition consists of a mixture of the juice of the ash tree, a liquid preservative, such as alcohol, and a flavoring element such as oil of wintergreen or peppermint.

Ash weed or podagraria, it will be understood, is a species of the genus Ægopodium and as a shrub or tree grows wild in different parts of the United States. In different localities it is known as the small wild angelica, goatwort, goats food and herb-gerard.

In preparing the composition we prefer to use the ingredients in about the following proportions, viz, seventy-five (75%) per cent juice of ash weed, twenty (20%) per cent preservative, such as alcohol and five (5%) per cent oil of wintergreen or peppermint.

The active ingredient of our composition is the juice or sap of the ash weed and this may be obtained either from the roots or stem. It is preferably obtained from freshly cut roots by squeezing them in a powerful press.

The composition is used by applying it directly to the gums and to the exposed portions of the roots of the affected teeth and in some instances it may be found advantageous to inject the composition into the gums around the teeth by means of a small hypodermic syringe.

Another form of treatment may be provided by mixing the composition with a soft, waxy carrier having a paraffine or spermaceti base and packing the latter upon the gums around the affected teeth.

Our composition of matter is relatively simple, may be easily and cheaply produced and is very effective in performing its intended functions.

We claim as our invention:

A composition of matter for the treatment of pyorrhetic disorders comprising approximately 80% of the juice of ash weed, and 20% alcohol.

In testimony whereof we have signed our names to this specification.

KEY KAMIYA.
TSURUICHI H. WAKINO.